APPARATUS FOR DETECTING LOCALIZED HIGH TEMPERATURES IN ELECTRONIC COMPONENTS

Filed Dec. 1, 1960

INVENTOR:
Bernard Sklar
By Alan C. Rose
Attorney

United States Patent Office 3,182,201

Patented May 4, 1965

3,182,201

APPARATUS FOR DETECTING LOCALIZED HIGH TEMPERATURES IN ELECTRONIC COMPONENTS

Bernard Sklar, 4615 Brewster Drive, Tarzana, Calif.

Filed Dec. 1, 1960, Ser. No. 72,927

4 Claims. (Cl. 307—88.5)

The present invention relates to temperature detection and control apparatus, particularly for transistor circuits such as those employed in computers or other data-processing apparatus.

It is well-known that transistors are temperature sensitive and tend to change their characteristics as the ambient temperature rises under adverse operating conditions. With increasing temperatures, false readings and errors in digital computations can readily occur. In the past, it has been proposed that thermistors or the like be incorporated into the circuitry to compensate for the changes in the operating characteristics of the transistors. These circuits are not generally satisfactory, however, as the thermistors do not necessarily assume the same temperature as the transistors with which they are associated. Thus, for example, with forced air cooling, the transistors generate heat inside their protective casings and a heat gradient is established through the encapsulating material forming the protective casing. The thermistor, however, is cooled by the circulating air and does not normally generate heat within its protective coating. The thermistor is therefore normally at a different temperature than the transistor, and proper temperature compensation or monitoring does not take place.

A principal object of the present invention is to improve the accuracy and quality of temperature monitoring circuits for transistor apparatus.

This is accomplished by mounting a thermistor element and a p-n junction in intimate heat conducting contact within a casing which is substantially the same as the protective casing of the transistors which are also mounted within the apparatus. The p-n junction is biased to dissipate the same amount of power as the average transistor in the associated apparatus. Accordingly, the heat generated within the thermistor unit will correspond closely to that generated within each transistor assembly. Accurate monitoring of the temperature within the transistor assemblies is therefore possible. The thermistor may be employed to trigger a bi-stable circuit, to control suitable regulation or temperature compensation circuitry, or for any other desired purpose.

In accordance with a feature of the invention, a system involving a temperature monitoring apparatus includes a plurality of encapsulated transistors mounted in an enclosed space. A p-n junction and a thermistor element spaced from one another and in intimate heat-conducting relationship with each other are mounted in the same enclosed space with said transistors, and the p-n junction and thermistor assembly has a protective casing which is similar to or identical with those of the transistors.

The novel features which are believed to be characteristic of the invention both as to its organization and method of operation, together with further objects and advantages thereof, will be better understood from the following description considered in connection with the accompanying drawing in which an illustrative embodiment of the invention is disclosed, by way of example. It is to be expressly understood, however, that the drawing is for the purpose of illustration and description only and is not intended to define the limitations of the invention. In the drawing.

Figure 1:
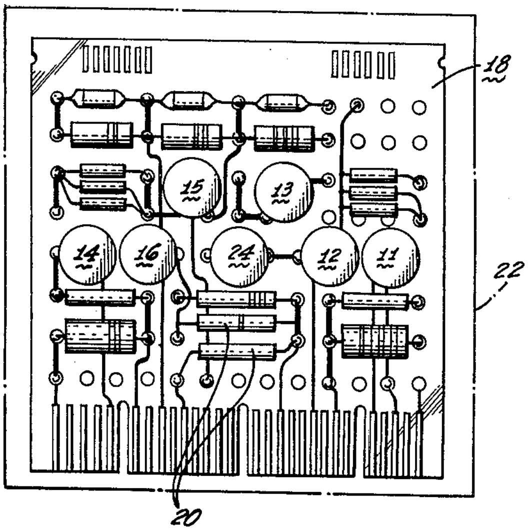
FIG. 1 shows a printed circuit board including a plurality of transistors and a temperature monitoring device, in accordance with the present invention.

Referring to FIG. 1 of the drawing, a number of transistors 11 through 16 are mounted on an insulating plastic printed circuit board 18. Other electrical circuit components such as the resistors 20 are also mounted on the printed circuit board.

The entire printed board 18 with its associated circuit elements is mounted in a narrow slot within a computer structure. The enclosing computer structure is represented by the dash-dot lines 22 which enclose the circuit board 18. Under operating conditions, the transistors 11 through 16 generate heat within their structures. This is principally due to the temperature generated at the p-n junction between the emitter and the base of the transistor. The ambient temperature within the housing indicated by the lines 22 is determined by the heat generated by the transistors and the resistors and by the nature of the forced air cooling which is frequently employed in large data processing units.

The component 24 at the center of the printed circuit board is the temperature sensing unit in accordance with the present invention. It includes a p-n junction and a thermistor unit as its active elements, and has an outer casing which is identical with that of the transistors 11 through 16. The p-n junction of the unit 24 is biased to a level of power dissipation which is equal to that within each of the transistors 11 through 16. With the same level of power dissipation within the casing, and the same ambient temperature outside the casing, the temperature at the thermistor element of unit 24 is exactly the same as that within the transistor assemblies 11 through 16.

Figures 2, 3:
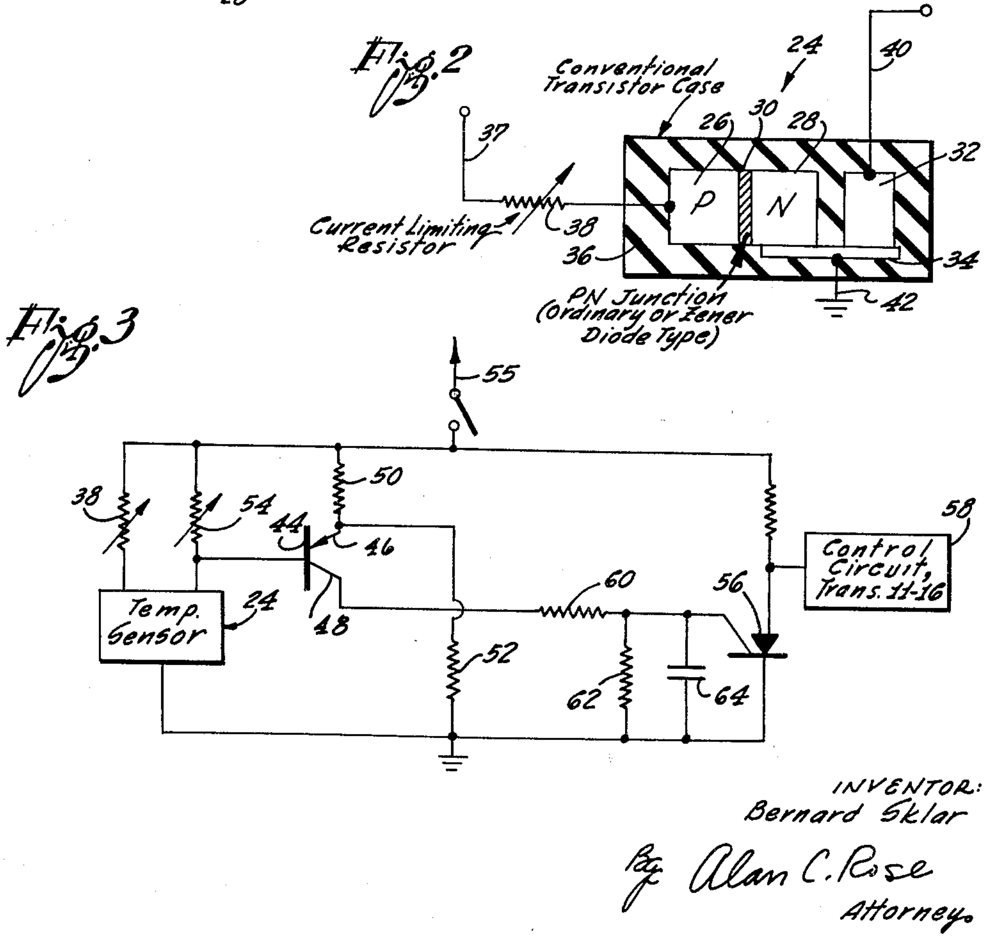
FIG. 2 is a detailed showing of the temperature monitoring device of the present invention.
FIG. 3 is a circuit diagram of a typical temperature monitoring circuit of the present invention.

FIG. 2 is a schematic detailed view of the temperature monitoring component 24 of FIG. 1. The device of FIG. 2 includes a p-n- junction having a p-type portion 26, an n-type portion 28, and a junction 30 between the two elements of different conductivity types. Spaced from the p-n junction is an additional slice of temperature-sensitive material 32. The element 32 may be formed of any conventional thermistor material. Typical materials which may be employed are discussed in an article entitled "Properties and Uses of Thermistors," by J. A. Becker, C. B. Greene and G. L. Pearson, which appeared in the November 1946 issue of Electrical Engineering, the journal of The American Institute of Electrical Engineers, at pages 711 through 725. These materials include metallic oxides and semiconductors, for specific example; other materials having appropriate resistance versus temperature characteristics may also be used.

A metallic plate 34 of high thermal conductivity is in intimate heat conducting relationship with one portion 28 of the p-n junction and also with the thermistor material 32. A conventional casing 36 which is substantially the same as that on the transistors 11 through 16 of FIG. 1 encloses the p-n junction and the thermistor material. The metallic element 34 makes broad area ohmic contact with the portion 28 of the p-n junction and with the thermistor element. The p-n diode unit is biased by the circuit including a poistive source of voltage connected to the lead 37 and the variable resistor 38. As power is dissipated in the p-n junction 30, the diode unit heats up, and this heat is transferred through the conductor 34 to the thermistor element 32. The resistance between lead 40 and the ground connection 42 is therefore reduced. The change in resistance is a faithful indication of the change in temperature within the unit 24 and also indicates the temperature within the transistors 11 through 16.

FIG. 3 is a circuit diagram of a typical control circuit which may be used in connection with the temperature sensing element 24. By way of example, the thermistor element in the unit 24 may have a resistance of about 1000 ohms at room temperature and a resistance of about 100 ohms at a temperature of about 70° C. The triggering transistor has a base electrode 44, an emitter electrode 46 and a collector electrode 48. The two input electrodes of the transistor are the base electrode 44 and the emitter electrode 46. Under normal conditions, these electrodes are biased in the reverse direction and the transistor is de-energized. With the resistor 50 having a value of approximately 100 ohms and the resistor 52 having a value of about 121 ohms, the emitter electrode 46 is biased to a potential of about 6.5 volts. With the resistance of the thermistor 32 at room temperature being about 1000 ohms and the variable resistor 54 being adjusted to a value of about 100 ohms, the base electrode 44 will have a positive voltage of about 10 volts. In order for the transistor to become energized, the voltage at the base 44 must drop to a positive value which is less than the 6.5 volt level of the emitter 46. Thus, for example, assuming a 0.5 volt drop through the base-to-emitter circuit of the transistor, the transistor will become energized when the base 44 drops to a voltage of about 6 volts. This will occur when the resistance of the thermistor element drops to about 100 ohms. Under these circumstances, the 12 volts applied to lead 55 will divide equally between the resistor 54 and the thermistor element so that the base 44 of the transistor is biased to about 6 volts. When the transistor is energized, the breakdown unit 56 also becomes energized and a control circuit 58 is actuated. The control circuit 58 changes the mode of operation of the transistors 11 through 16, by de-energizing them for example. A suit-warning circuit may also be energized.

Alternatively, instead of a trigger circuit, the change in resistance of the thermistor element may be employed to progressively change the bias or other parameters of the transistors 11 through 16 or their associated circuits to counteract the effect of temperature.

The transistor of FIG. 3 may be of the type 2N1132. The trigger device 56 may be of the type 3A61SCR. Typical values for the input circuit to the trigger unit would be resistances of 1000 ohms for resistors 60 and 62 and a capacitance of about 100 microfarads for the capacitor 64. Before the unit 56 is triggered to its low resistance state, it presents essentially an open circuit. The input lead to control circuit 58 is therefore approximately at the 12-volt potential of lead 56. The unit 55 acts much like a thyratron, and therefore, following triggering, it presents a short circuit. Accordingly, the voltage at the input to control circuit 58 drops to a level close to ground potential.

As mentioned above, the present system is particularly advantageous for monitoring the temperature in compact transistor apparatus of the packaged circuit type. In this connection, it is useful to compare the operation of the present arrangements with those which have been employed heretofore. By way of example, in the case of prior art arrangements in which the sensing thermistor is a separate element, its temperature is not a definite function of the temperature of the encapsulated transistors. The thermistor in these prior art arrangements measures the ambient temepratures, or the temperature at the point of mounting, rather than the temperature of the transistors within their individual casings. One of the chief reasons for failure or improper operation of the prior arrangements lies in the presence of hot spots at the transistor junctions. Thus, for eaxmple, when the flow of cooling air stops or is blocked, the temperature within the transistor may jump by 50 degrees. However, the ambient temperature, as sensed by the thermistor, might only rise a few degrees, and at a much slower rate. Thus, prior art arrangements are wholly unsatisfactory.

In accordance with the ararngements of the present invention, the thermistor is encapsulated with a p-n junction providid a source of heat so that the assembly includes an artificial hot spot. Under these conditions, the temperature of the thermistor follows that of the transistor junctions, and the device may be used to provide an accurate indication of the cooling ability of the air for critical transistor junctions on the chassis.

It is to be understood that the above-described arrangements are illustrative of the application of the principles of the invention. Numerous other arrangements may be devised by those skilled in the art without departing from the spirit and scope of the invention. Thus, by way of example, and not of limitation, the temperature sensing component may include a reverse biased zener diode as the heat generating element or some element other than a diode, as long as the heat generator has about the same characteristics with respect to the generation of heat as a transistor. Through the use of a zener p-n junction diode with a breakdown voltage somewhat less than that of the transistor supply, higher efficiency may be obtained than with a standard rectifying p-n junction. Accordingly, from the foregoing remarks, it is to be understood that the present invention is only to be limited by the spirit and scope of the appended claims.

I claim:

1. In a temperature monitoring apparatus, a plurality of transistors mounted in an enclosed space, said transistors being enclosed by protective coverings, an additional component mounted in the same enclosed space, said additional component having a protective coating similar to that of said transistors, said additional component further comprising a p-n junction, a heat sensitive element spaced from said p-n junction, an element of high heat conductivity bridging the space between said heat sensitive element and said p-n junction, a circuit responsive to high temperature conditions for avoiding adverse effects of such high temperature conditions on said transistors, and means for connecting said heat sensitive element to control the operation of said circuit.

2. In a temperature monitoring apparatus, a plurality of transistors mounted in an enclosed space, said transistors being enclosed by protective coverings, an additional component mounted in the same enclosed space, said additional component having a protective coating identical to that of said transistors, said additional components further comprising a p-n junction, a thermistor element spaced from said p-n junction, an element of high heat conductivity bridging the space between said thermistor element and said p-n junction, and a trigger circuit connected to said thermistor for energization when the temperature of said transistors exceeds a predetermined level.

3. In a temperature monitoring apparatus, a plurality of transistors mounted in an enclosed space, said transistors being enclosed by protective coverings, an additional component mounted in the same enclosed space, said additional component having a protective coating identical to that of said transistors, said additional components further comprising a heat generating element, a temperature sensitive resistance element spaced from said heat generating element, a bridging member of high heat conductivity in heat transferring contact with said two elements, and a trigger circuit connected to said resistance element for energization when the temperature of said resistance element exceeds a predetermined level.

4. In a temperature monitoring apparatus, a plurality of transistors mounted in an enclosed space, said transistors being enclosed by protective coverings, an additional component mounted in the same enclosed space, said additional component having a protective coating similar to that of said transistors, said additional component further comprising a p-n junction, a heat sensitive element spaced from said p-n junction, an element of high heat conductivity bridging the space between said heat sensitive element and said p-n junction, and a control circuit connected to said heat sensitive element, said control circuit being coupled to change the operation of said transistors upon change in temperature of said heat sensitive element.

References Cited by the Examiner

UNITED STATES PATENTS

| | | | |
|---|---|---|---|
| 2,930,904 | 3/60 | Fritts | 307—88.5 |
| 2,994,759 | 8/61 | Lipman | 307—88.5 |
| 3,050,638 | 8/62 | Evans et al. | 307—88.5 |
| 3,057,557 | 10/62 | Guyton et al. | 307—88.5 |

JOHN W. HUCKERT, *Primary Examiner.*

ARTHUR GAUSS, *Examiner.*